United States Patent Office 3,576,888
Patented Apr. 27, 1971

3,576,888
PROCESS FOR THE PREPARATION OF UNSATURATED FLUORINATED ALCOHOLS
Bernard M. Lichstein, Elizabeth, and Cyril Woolf, Morristown, N.J., assignors to Allied Chemical Corporation, New York, N.Y.
No Drawing. Continuation-in-part of application Ser. No. 641,460, May 26, 1967. This application Mar. 10, 1969, Ser. No. 805,875
Int. Cl. C07c *33/10*
U.S. Cl. 260—633        2 Claims

ABSTRACT OF THE DISCLOSURE

A process for the preparation of unsaturated fluorine-substituted hydroxy compounds whereby fluorinated dihydric alcohols are contacted with a dehydrating agent. Excellent yields of high purity product are obtained.

---

This is a continuation-in-part of our copending application Ser. No. 641,460, filed May 26, 1967, and now abandoned.

This invention relates to a process for the preparation of unsaturated fluorine-substituted hydroxy compounds whereby fluorinated dihydric alcohols are contacted with a dehydrating agent. Excellent yields of high purity product are obtained.

Unsaturated fluorine-containing hydroxy compounds having the formula

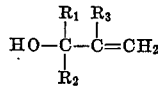

wherein $R_1$ and $R_2$ are perhalogenated alkyl groups preferably having from 1 to 5 carbon atoms in which the halogen atoms can be fluorine and chlorine with at least one fluorine atom attached to each carbon atom and $R_3$ can be hydrogen or alkyl groups preferably having from 1 to 5 carbon atoms, are valuable nematocidal and bactericidal agents. These compounds have been disclosed by Dear and Gilbert in copending application Ser. No. 550,113 filed May 16, 1966, now abandoned. According to the process disclosed in that application, these compounds can be prepared by reacting an alkenyl magnesium halide with a perhalogenated acetone in a solvent, such as tetrahydrofuran, followed by an acid hydrolysis.

This process has several disadvantages. It employs Grignard reagents, which are comparatively expensive, and the solvent employed in the process must be removed. The products produced according to this process are difficult to purify since the above-described alcohols form azeotropic mixtures with solvents including tetrahydrofuran and treatment with hot, concentrated sulfuric acid is required to separate the products from the reaction mixture. Thus a process which does not employ a solvent and avoids the use of Grignard reagents is highly desirable for the preparation of these alcohols.

We have discovered that the unsaturated fluorine-containing hydroxy compounds described above can be readily prepared in excellent yields by contacting a fluorinated dihydric alcohol having the formula

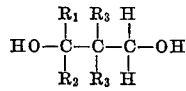

wherein $R_1$, $R_2$ and $R_3$ have the meanings given above and wherein at least one $R_3$ is hydrogen with a dehydrating agent. The product after separation from the reaction mixture by distillation is obtained in excellent yield and high purity.

This result was highly surprising, since, as is well known, tertiary alcohol groups are more reactive than secondary alcohol groups, and primary alcohol groups are least reactive. In the present case, the presence of perhaloalkyl groups adjacent to the tertiary alcohol group undoubtedly prevents dehydration of the tertiary alcohol groups; but that the tertiary alcohol group, which still contains a labile hydrogen atom, would not enter the reaction, was unexpected.

The fluorinated dihydric alcohols described above and methods for their preparation are disclosed in our copending application U.S. Ser. No. 539,265, filed April 1, 1966. As described therein, these fluorinated dihydric alcohols can be prepared by reacting a perhalogenated ketone with an aldehyde, preferably in the presence of a suitable catalyst such as alkali metal fluorides and alkaline earth metal fluorides, in a mol ratio of ketone to catalyst of from about 10:1 to about 100:1 to form the corresponding fluoroalkyl-substituted aldehyde. The aldehyde may thereafter be reduced to the corresponding fluorinated dihydric alcohol in known manner.

Suitable fluorinated dihydric alcohols include: 1,1-bis (perfluoromethyl)-1,3-propanediol, 1 - trifluoromethyl-1-perfluoroethyl-1,3-propanediol, 1,1 - bis(perfluoroethyl)-1,3-propanediol, 1-perfluoromethyl-1-perfluoropropyl-1,3-propanediol, 1-perfluoroethyl - 1 - perfluoropropyl - 1,3-propanediol, 1,1-bis(perfluoropropyl-1,3-propanediol, 1,1-bis(perfluoropentyl)-1,3-propanediol, 1 - chlorodifluoromethyl-1-perfluoromethyl-1,3-propanediol, 1,1-bis(chlorodifluoromethyl) - 1,3 - propanediol, 1,1 - bis(perfluoromethyl)-2-methyl - 1,3 - propanediol, 1,1 - bis(perfluoromethyl-2-pentyl-1,3-propanediol, and the like.

Dehydrating agents useful in the invention are conventional. Suitable dehydrating agents include for example metal oxides, such as alumina, thoria, acid clay catalysts and the like; sulfur-containing compounds such as sulfuric acid, fuming sulfuric acid, oleum, sulfur trioxide, sodium or potassium bisulfate, dimethylsulfoxide, methyl chlorosulfite, napthalene -$\beta$- sulfonic acid, p - toluene sulfonyl chloride, thionyl chloride or thionyl chloride-pyridine, and the like; phosphorus-containing compounds such as phosphoric acid, phosphorus pentoxide, phosphorus oxychloride, phosphoric anhydride and the like; acids and anhydrides such as boric acid, hydrochloric acid, hydrobromic acid, oxalic acid, phthalic anhydride, succinic anhydride and the like; and other known dehydrating agents including boron trifluoride etherate, N-bromoacetamide, N-bromoacetamide-pyridine-$SO_2$, diketene and the like. Other suitable dehydrating agents will be known to one skilled in the art. Good results have been obtained by reaction of the fluorinated dihydric alcohol with concentrated sulfuric acid. The amount of dehydrating agents, such as sulfuric acid, used is not critical and can vary from a small catalytic amount, on the order of 1% by weight to a large excess, on the order of 100% by weight or more of the fluorinated dihydric alcohol.

The temperature of the reaction is not critical and will be chosen depending upon the dehydrating agent employed since, as will be known to one skilled in the art, different dehydrating agents may require different reaction conditions for optimum effectiveness. In general suitable temperatures can be from room temperature up to about 400° C. At higher temperatures of reaction the product will be obtained in a shorter reaction time; however, the temperature of reaction should be low enough so that excessive dehydrohalogenation and decomposition reactions are minimized. The optimum temperature of reaction and quantity of dehydrating agent employed can be readily ascertained by test runs for a given system of reactant and dehydrating agent.

The product can be recovered in any convenient manner depending upon the temperatures of reaction employed, such as by vacuum distillation of the product as it is formed, distillation at atmospheric pressure at higher temperatures, or fractional distillation of the reaction mixture. The product can be purified if required in conventional manner such as by recrystallization, distillation and the like, as will be known to one skilled in the art.

The invention can be illustrated further by the following examples, but it is to be understood that the invention is not to be limited to the details described therein. In the examples all parts are by weight unless otherwise noted.

EXAMPLE 1

77 parts of 1,1-bis(perfluoromethyl)-1,3-propanediol, were added to 250 parts by volume of concentrated sulfuric acid over a one-hour period. The temperature was maintained at 180–190° C. during addition, and was raised to 200° C. to distill the product through a water condenser. The pale yellow, milky product was dried over magnesium sulfate to give a clear liquid.

Vapor phase chromatographic analysis showed the product to be 98% pure. The product decolorized potassium permanganate solutions. Infrared and nuclear magnetic resonance analyses confirmed the structure of 1,1,1-trifluoro-2-trifluoromethyl-3-butene-2-ol. Elemental analysis was as follows:

Calculated for $C_5H_4CF_6$ (percent): C, 30.94; H, 2.08; F, 58.7. Found (percent): C, 30.71; H, 2.08; F, 58.8. The product was obtained in 50% yield.

EXAMPLE 2

31 parts of 1,1-bis(perfluoromethyl)-1,3-propanediol were added to 20 parts by volume of concentrated sulfuric acid, which had been preheated to 250° C., over a period of about 4 hours. The product was distilled up to 300° C., dried over magnesium sulfate, filtered and redistilled. A first fraction boiling at 76° C. was 98% pure according to vapor phase chromatographic analysis. Elemental analysis found for 1,1,1-trifluoro-2-trifluoromethyl-3-butene-2-ol was C, 30.6; H, 2.16.

EXAMPLE 3

The procedure of Example 2 is followed using 1-perfluoromethyl-1-chlorodifluoromethyl-1,3-propanediol. The structure of the product, 1,1,1-trifluoro-2-chlorodifluoromethyl-3-butene-2-ol is confirmed by infrared and nuclear magnetic resonance analyses.

EXAMPLE 4

The procedure of Example 2 is followed using 1,1-bis(perfluoromethyl)-2-methyl-1,3-propanediol. The structure of the product 1,1,1-trifluoro-2-trifluoromethyl-3-methyl-3-butene-2-ol, is confirmed by infrared and nuclear magnetic resonance analyses.

It will be apparent that many modifications and variations may be effected without departing from the novel concepts of the present invention, and the illustrative details disclosed are not to be construed as imposing undue limitations on the invention.

We claim:
1. A process for the preparation of compounds having the formula

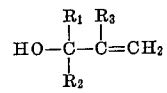

wherein $R_1$ and $R_2$ are perhalogenated alkyl groups of 1 to 5 carbon atoms in which the halogen atoms are selected from the group consisting of fluorine and chlorine with at least one fluorine atom attached to each carbon atom, and $R_3$ is hydrogen or alkyl of 1 to 5 carbon atoms which comprises contacting a fluorinated dihydric alcohol having the formula

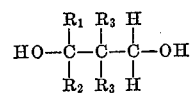

wherein $R_1$, $R_2$ and $R_3$ have the meanings given above and wherein at least one $R_3$ is hydrogen with a dehydrating agent, selected from the group consisting of alumina, thoria, sulfuric acid, fuming sulfuric acid, oleum, sodium bisulfate, potassium bisulfate, dimethylsulfoxide, naphthalene-$\beta$-sulfonic acid, phosphoric acid, phosphorus pentoxide, phosphoric anhydride, boric acid, hydrochloric acid, hydrobromic acid, oxalic acid, phthalic anhydride, and boron trifluoride etherate, to remove water, at a temperature from room temperature to 400° C.

2. A process according to claim 1 wherein said dehydrating agent is sulfuric acid.

References Cited

UNITED STATES PATENTS 2,490,753    12/1949    Hill et al. _____ 260—633X

OTHER REFERENCES

Fieser et al., Org. Chem., D. C. Heath, Boston, 1944, pp. 54–58.

Henne et al., Jour. Amer. Chem. Soc., 72, pp. 3577–3579, 1950.

McBee et al., Jour. Amer. Chem. Soc., 74, pp. 1387–1390, 1952.

McBee et al., Jour. Amer. Chem. Soc., 75, pp. 2324–2326, 1953.

Lovelace et al., Aliphatic Fluorine Compounds, 1958, Reinhold Publ. Corp., New York, p. 106.

HOWARD T. MARS, Primary Examiner

U.S. Cl. X.R.

260—999